United States Patent
Maung

(10) Patent No.: US 12,441,267 B2
(45) Date of Patent: Oct. 14, 2025

(54) OCCUPANT SAFETY IN A VEHICLE

(71) Applicant: Raymond Tin Aung Maung, Kamloops (CA)

(72) Inventor: Raymond Tin Aung Maung, Kamloops (CA)

( * ) Notice: Subject to any disclaimer, the term of this patent is extended or adjusted under 35 U.S.C. 154(b) by 379 days.

(21) Appl. No.: 18/014,165

(22) PCT Filed: Sep. 29, 2021

(86) PCT No.: PCT/IB2021/000676
§ 371 (c)(1),
(2) Date: Jan. 2, 2023

(87) PCT Pub. No.: WO2022/069943
PCT Pub. Date: Apr. 7, 2022

(65) Prior Publication Data
US 2023/0365088 A1    Nov. 16, 2023

Related U.S. Application Data

(60) Provisional application No. 63/198,153, filed on Sep. 30, 2020.

(51) Int. Cl.
*B60R 21/02*     (2006.01)
*B62D 24/04*     (2006.01)
*B62D 39/00*     (2006.01)

(52) U.S. Cl.
CPC ............. *B60R 21/02* (2013.01); *B62D 24/04* (2013.01); *B62D 39/00* (2013.01)

(58) Field of Classification Search
CPC ........ B60R 21/02; B62D 24/04; B62D 27/06; B62D 39/00
USPC .............................................. 296/35.2, 35.3
See application file for complete search history.

(56) References Cited

U.S. PATENT DOCUMENTS

| | | | |
|---|---|---|---|
| 3,162,479 A | 12/1964 | Hewitt | |
| 3,423,124 A * | 1/1969 | Hewitt | B60N 2/42736 296/68.1 |
| 3,480,291 A * | 11/1969 | Hilfiker | B62D 39/00 180/271 |
| 3,508,783 A * | 4/1970 | Schlanger | B62D 39/00 296/35.2 |
| 3,575,454 A * | 4/1971 | Meeker | B60F 1/005 104/246 |

(Continued)

FOREIGN PATENT DOCUMENTS

| CN | 105882588 A | 8/2016 |
|---|---|---|
| DE | 10224065 A1 | 8/2016 |

*Primary Examiner* — Jason S Morrow
(74) *Attorney, Agent, or Firm* — Intellent Patents LLC; Ahmed Alhafidh

(57) ABSTRACT

An apparatus for facilitating occupant safety in a vehicle having a vehicle frame includes a releasable occupant retainer for retaining at least one occupant, the retainer including an occupant seat, a retainer support, and at least one occupant retainer impact absorber coupled between the occupant seat and the retainer support. The apparatus includes a retainer mount configured to be coupled to the vehicle frame, the retainer mount including a mount support and at least one releasable connector coupled to the mount support and releasably coupled to the retainer support of the occupant retainer, the at least one releasable connector configured to release the retainer support upon a severe collision event.

1 Claim, 13 Drawing Sheets

(56) References Cited

U.S. PATENT DOCUMENTS

| | | | | |
|---|---|---|---|---|
| 3,695,629 | A | | 10/1972 | Schlanger |
| 3,831,998 | A | * | 8/1974 | Hewitt ..................... B62D 1/19 |
| | | | | 180/271 |
| 3,837,422 | A | | 9/1974 | Schlanger |
| 4,826,209 | A | * | 5/1989 | Farris ..................... B62D 39/00 |
| | | | | 180/274 |
| 5,738,378 | A | * | 4/1998 | Yazejian ................ B62D 39/00 |
| | | | | 180/232 |
| 6,464,275 | B2 | * | 10/2002 | Laurent .................. B62D 39/00 |
| | | | | 180/274 |
| 6,522,998 | B1 | * | 2/2003 | Mazur ............... G01M 17/0078 |
| | | | | 703/7 |
| 7,721,837 | B1 | * | 5/2010 | DeVeau .................. B60R 21/02 |
| | | | | 180/274 |
| 9,988,009 | B2 | | 6/2018 | Yang et al. |
| 10,106,212 | B2 | * | 10/2018 | Andersen ............... B62D 39/00 |
| 10,611,412 | B1 | * | 4/2020 | Attia ..................... B62D 21/15 |
| 11,254,272 | B2 | * | 2/2022 | Tse ..................... B60R 21/0134 |
| 2017/0225724 | A1 | | 8/2017 | Andersen |
| 2021/0071734 | A1 | | 3/2021 | Kwiatkowski et al. |

\* cited by examiner

OCCUPANT SAFETY IN A VEHICLE

CROSS-REFERENCE TO RELATED APPLICATIONS AND CLAIM OF PRIORITY

This application is a National Stage Application filed under 35 U.S.C. 371 claiming priority to International Stage Application Serial No. PCT/IB2021/000676 filed Sep. 29, 2021 which claims priority to Provisional Application Ser. No. 63/198,153 filed Sep. 30, 2020.

FIELD OF TECHNOLOGY

Embodiments of this invention relate to occupant safety and more particularly to facilitating occupant safety in a vehicle.

BACKGROUND

Some safety devices for protecting occupants in vehicles may include separable safety pods that may be designed to separate from the rest of the vehicle during a collision. However, such devices may not control the separation in a desirable manner and/or sufficiently protect the occupant within the pod after separation.

SUMMARY

In accordance with various embodiments, there is provided an apparatus for facilitating occupant safety in a vehicle having a vehicle frame, the apparatus including a releasable occupant retainer for retaining at least one occupant, the retainer including an occupant seat, a retainer support, and at least one occupant retainer impact absorber coupled between the occupant seat and the retainer support. The apparatus includes a retainer mount configured to be coupled to the vehicle frame, the retainer mount including a mount support and at least one releasable connector coupled to the mount support and releasably coupled to the retainer support of the occupant retainer, the at least one releasable connector configured to release the retainer support upon a severe collision event.

The retainer mount may be deformable upon the severe collision event and the at least one releasable connector may be configured to release the retainer support upon deformation of the retainer mount.

The apparatus may include one or more tension restraints coupled between the mount support of the retainer mount and the retainer support, each of the one or more tension restraints including a deformable impact absorber coupled to the mount support, and at least one flexible tension member coupled between the deformable impact absorber and the retainer support, wherein the tension restraint is configured such that deformation of the absorber releases tension on the at least one flexible tension member to facilitate movement of the retainer support relative to the retainer mount.

Each of the deformable impact absorbers of the one or more tension restraints may include light impact absorbing material.

Each of the deformable impact absorbers of the one or more tension restraints may include at least one shock absorber.

Each of the deformable impact absorbers of the one or more tension restraints may include at least one spring and/or one shock absorber.

Other aspects and features of embodiments of the invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
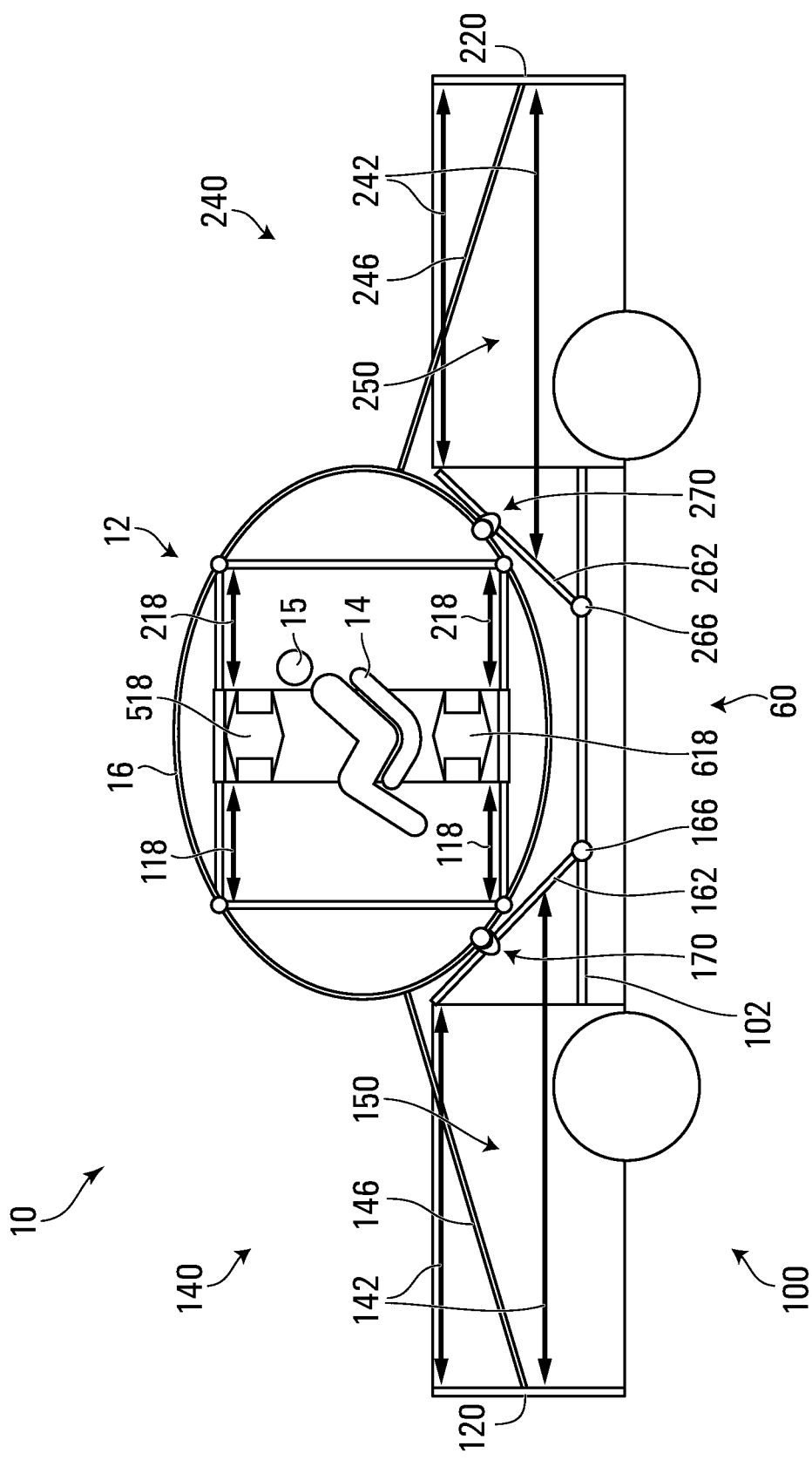
FIG. 1 is a schematic side view of an apparatus for facilitating occupant safety in a vehicle, according to various embodiments.

Referring to FIG. 1 there is shown a schematic view of an apparatus 10 for facilitating occupant safety in a vehicle 100 having a vehicle frame 102, in accordance with various embodiments. In some embodiments, the vehicle 100 may be a lightweight vehicle, such as, for example, an electric vehicle. In some embodiments, the vehicle 100 may not have a single power engine like many automobiles. For example, in some embodiments, power may be provided by motorized wheel hub(s) that may be 4 in number, for example.

In various embodiments, this may allow significant decrease in weight and/or provide space to create one or more impact absorption zones, which may in some embodiments, include absorption zones for protecting an occupant from four directions, as described in further detail below.

Referring to FIG. 1, the apparatus 10 is shown from a side view in a first configuration wherein the vehicle 100 has not been involved in a collision event.

Referring to FIG. 1, the apparatus 10 includes a releasable occupant retainer 12 for retaining at least one occupant. For example, in some embodiments, the releasable occupant retainer 12 may include a safety frame, which may be referred to as a cocoon frame, for example, for keeping an occupant of the vehicle 100 safe during a vehicle accident, such as a severe collision event. In some embodiments, the releasable occupant retainer 12 may be configured to keep the occupant safe during a collision, such as one involving a front, side, and/or rear impact.

Referring to FIG. 1, the releasable occupant retainer 12 includes an occupant seat 14. The occupant seat 14 may be configured to hold an occupant 15 during operation of the vehicle 100. In some embodiments, the occupant seat 14 may include occupant restraints such as a safety belt, for example. Referring to FIG. 1, the retainer 12 includes a retainer support or frame 16. In various embodiments, the retainer support or frame 16 may hold the occupant seat 14 and protect the occupant 15.

In FIG. 1, the retainer support 16 is shown schematically as an oval. However, in various embodiments, the retainer support 16 may include a frame made of a lightweight strong material, such as steel, for example, surrounding the occupant seat 14, which may protect the occupant 15 when the retainer 12 is released upon a severe collision.

In various embodiments, the retainer support 16 may be shaped to allow it to roll after it is dislodged from a retainer mount 60. For example, in some embodiments, the retainer support 16 may be the shape of an egg, cocoon, capsule, and/or another shape that is configured to roll. In various embodiments, the retainer support 16 may include a metal frame with reinforcements to protect the occupant 15 from external impacts. In some embodiments, the retainer support 16 may be mounted to the vehicle frame 102 via the retainer mount 60 as described herein. For example, in some embodiments, the retainer support 16 may be mounted using a tongue and groove configuration, and may be held in place by gravity and by releasable clips configured to release when there is sufficient force that will distort or deform the retainer mount 60 and dislodge the retainer support 16 from its position relative to the vehicle frame 102.

Figure 2:
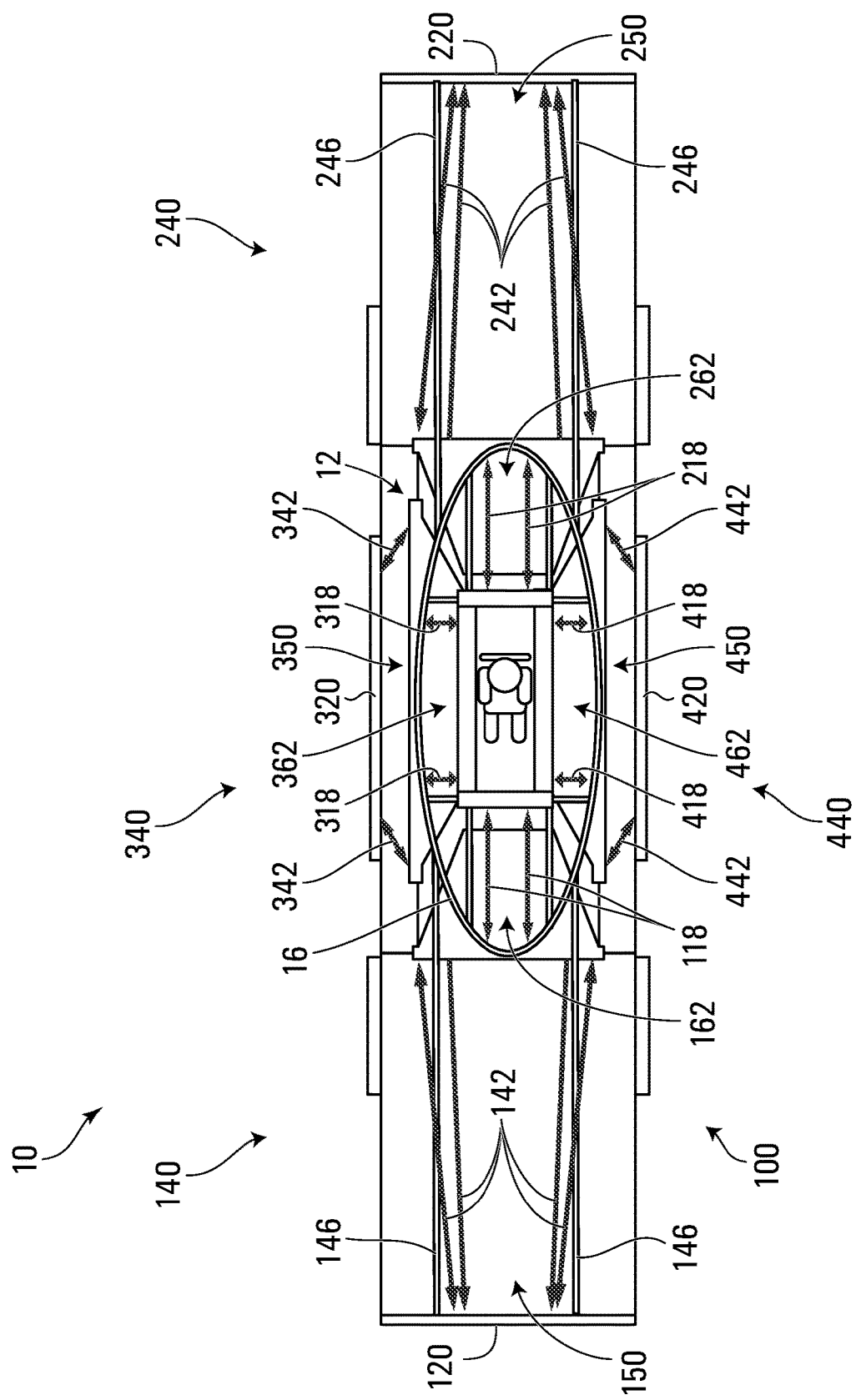
FIG. 2 is a schematic top view of the apparatus shown in FIG. 1, according to various embodiments.
Figure 3:
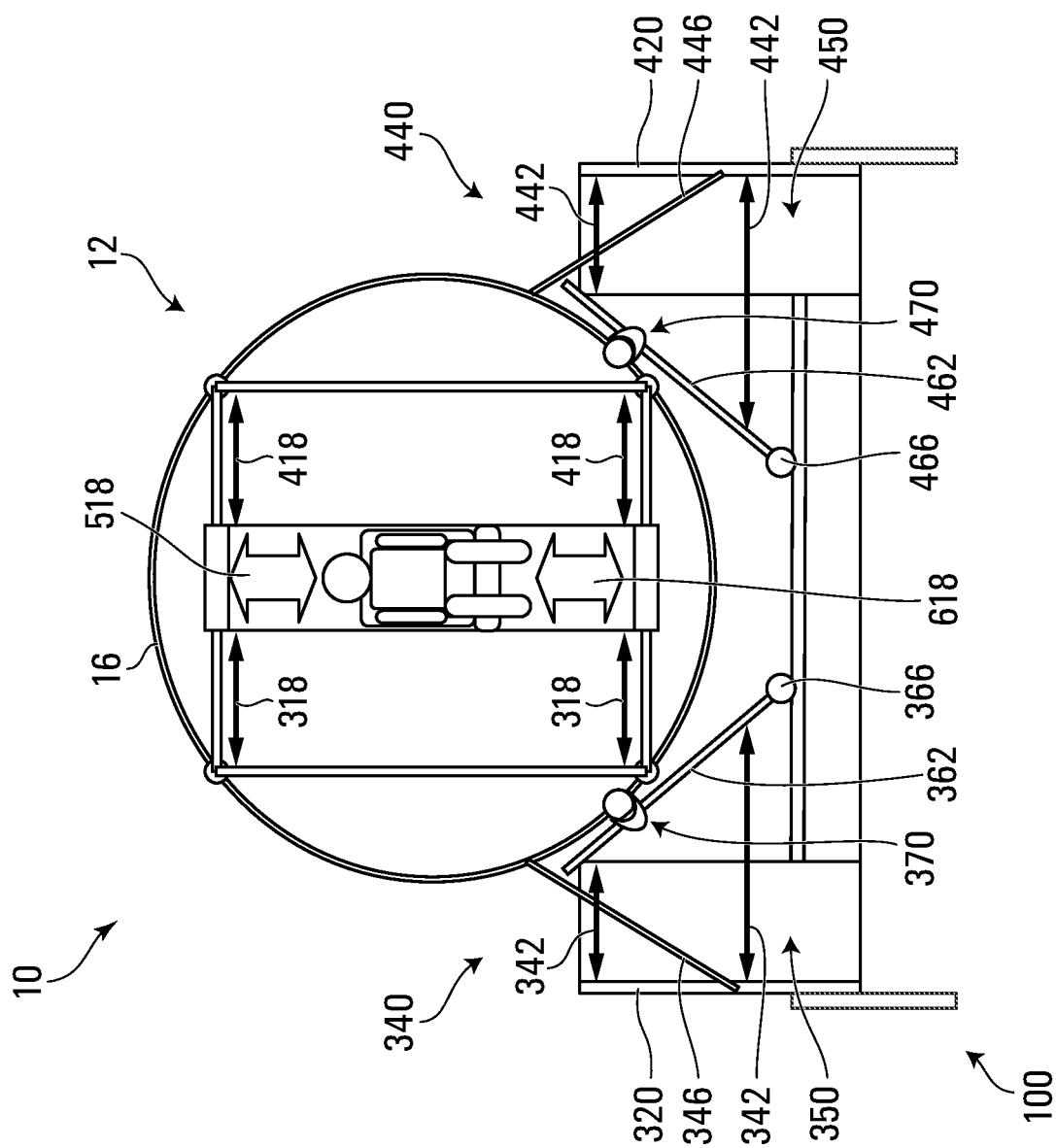
FIG. 3 is a schematic front view of the apparatus shown in FIG. 1, according to various embodiments.

Referring to FIGS. 1, 2, and 3, the releasable occupant retainer 12 includes occupant retainer impact absorbers, including front occupant retainer impact absorbers 118, rear occupant retainer impact absorbers 218, right occupant retainer impact absorbers 318, left occupant retainer impact absorbers 418, top occupant retainer impact absorbers 518 and bottom occupant retainer impact absorbers 618, coupled between the occupant seat 14 and the retainer support 16. Each of the occupant retainer impact absorbers may include one or more impact absorbing mechanisms and may include mechanical shock absorbers and springs. Each of the occupant retainer impact absorbers is shown schematically as double sided arrows in FIGS. 1, 2 and 3, where FIG. 1 is a side view, FIG. 2 is top view and FIG. 3 is a front view.

In various embodiments, the occupant retainer impact absorbers may include mechanical shock absorbers and/or springs. In some embodiments, the occupant retainer impact absorbers 118, 218, 318, 418, 518 and 618 are shown as single in these 2 dimensional diagrams, but in 3 dimensions (see FIGS. 9-11, for example), any or all may include at least 2 shocks or springs. For example, in some embodiments, the bottom occupant retainer impact absorbers 618 may include 4 shocks or springs, one at each corner of the occupant seat 14, between the occupant seat 14 and the retainer support 16.

In some embodiments, the occupant retainer impact absorbers 118 and 218 may act as front and rear occupant retainer impact absorbers and be configured to provide shock or impact absorbance for front and rear impacts or shocks; the occupant retainer impact absorbers 518 and 618 may act as vertical occupant retainer impact absorbers and be configured to provide shock or impact absorbance for vertical shocks; and the occupant retainer impact absorbers 318 and 418 may act as side occupant retainer impact absorbers and be configured to provide shock or impact absorbance for side shocks. In some embodiments, the occupant retainer impact absorbers 118 and 218, 318 and 418, and 518 and 618 may be configured to absorb impacts in mutually orthogonal directions. In various embodiments, by including three sets of mutually orthogonal impact absorbers, impacts from all directions may be absorbed by the impact absorbers 118, 218, 318, 418, 518 and 618. In various embodiments, working together, the occupant retainer impact absorbers 118, 218, 318, 418, 518 and 618 may absorb impacts in all directions.

In some embodiments, the occupant retainer impact absorbers 118, 218, 318, 418, 518 and 618 may each include a shock absorber and/or a spring, for example. In some embodiments, the occupant retainer impact absorbers 118, 218, 318, 418, 518 and 618 may help to keep the occupant 15 safe from shocks or jarring impacts, such as, when the retainer 12 is released upon a severe collision. In various embodiments, the occupant retainer impact absorbers may be positioned so that they will be directed away from the occupant seat 14. For example, in some embodiments, each of the occupant retainer impact absorbers may be aligned such that they are not pointed at the occupant seat 14. In various embodiments, such a configuration may avoid safety issues associated with the occupant retainer impact absorbers releasing towards an occupant in the occupant seat 14.

Figure 4:
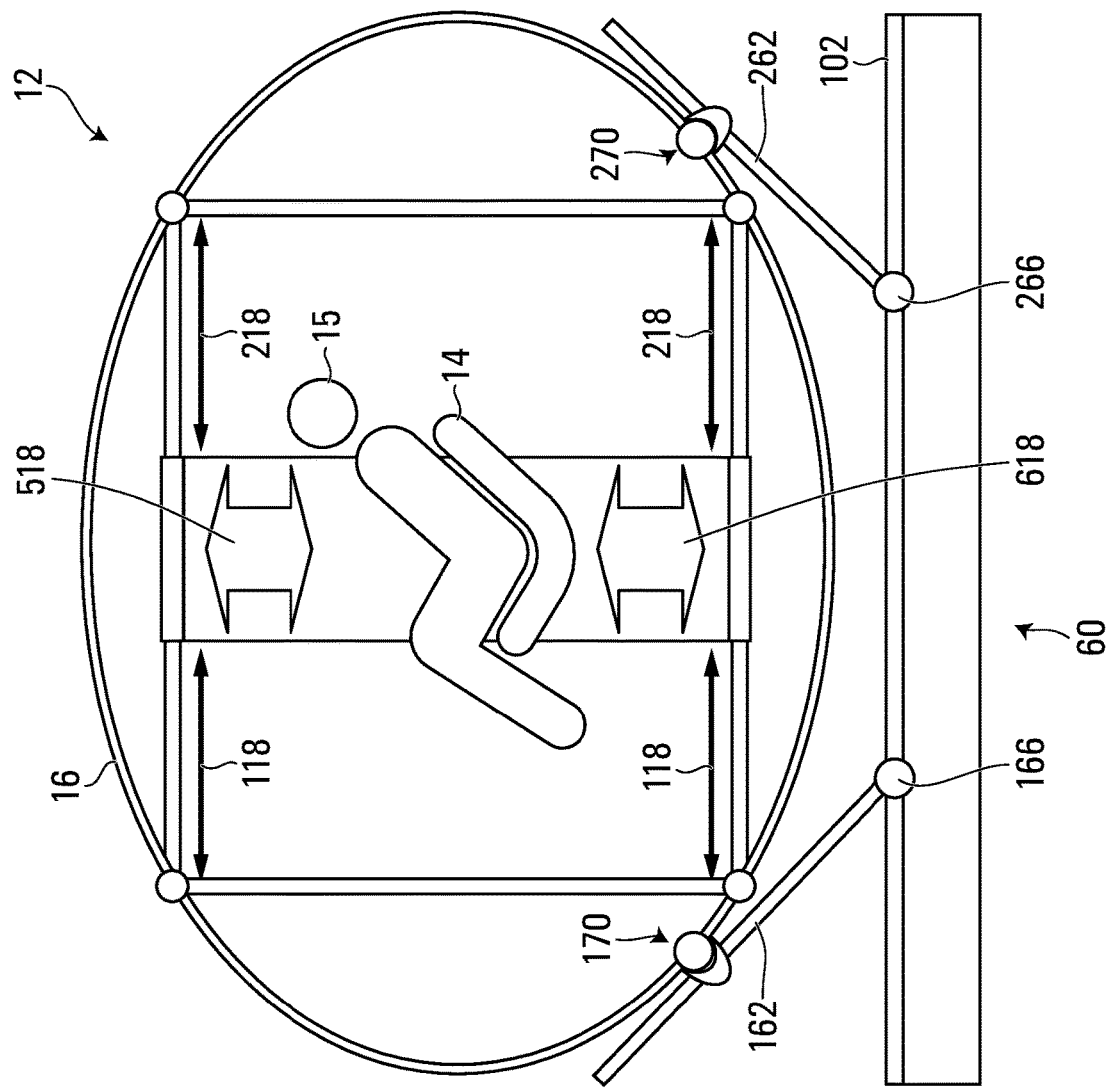
FIG. 4 is a schematic side view of a portion of the apparatus shown in FIG. 1, according to various embodiments.

Referring to FIG. 1, the apparatus 10 also includes the retainer mount 60 coupled to the vehicle frame 102 of the vehicle 100. In some embodiments, the retainer mount 60 may act as a mount system. Referring to FIG. 4, the retainer mount 60 is shown in further detail. The retainer mount 60 includes a front mount support 162 and a rear mount support 262. In some embodiments, the front and rear mount supports 162 and 262 may be strong and rigid to support the retainer support 16 sitting on them.

In various embodiments, the retainer mount 60 may include front and rear pivotable connectors 166 and 266 for pivotably coupling the front and rear mount supports 162 and 262 to the vehicle frame 102. For example, in some embodiments, the front and rear pivotable connectors 166 and 266 may operate generally similarly to a hinge in door. In some embodiments, the front and rear pivotable connectors 166 and 266 may each include a connector that is configured to pivot under a threshold force or torque that may be experienced during a severe collision event. In various embodiments, the front and rear pivotable connectors 166 and 266 may include any connector that will pivot when there is sufficient stress.

Referring to FIG. 4, the retainer mount 60 may include releasable connectors 170 and 270 coupled to the front and rear mount supports 162 and 262 respectively and releasably coupled to the retainer support 16 of the occupant retainer 12. In some embodiments, the front and rear mount supports 162 and 262 may each include a plate as can be seen in the top view shown in FIG. 2. In some embodiments the plates may be made of a strong lightweight material, such as steel, for example. In some embodiments, using a plate may improve ease of manufacturing of the apparatus 10.

In various embodiments, the releasable connectors 170 and 270 may be configured to release the retainer support 16 upon a severe collision event, as will be described in further detail below. For example, in some embodiments, the releasable connectors 170 and 270 may each include a tongue and groove connector including a tongue coupled to the retainer support 16 and a respective groove coupled to each of the front and rear mount supports 162 and 262 (as shown in FIG. 4, for example).

In various embodiments, the releasable connectors 170 and 270 may each include additional or alternative connectors, such as, for example, a magnetic connector, a matching tongue and groove connector, a chain or rubber or plastic links which are configured to be disrupted at a certain tension, and/or another connector configured to release when under a threshold force.

Referring to FIG. 3, in some embodiments, the retainer mount 60 may include side mount supports 362 and 462 which may be generally similar to the front and rear mount supports 162 and 262, and may be configured to pivot on pivotable connectors 366 and 466 in response to a side impact for example. The retainer mount 60 may include releasable connectors 370 and 470 coupled to the side mount supports 362 and 462. In various embodiments, the releasable connectors 170, 270, 370 and 470 may be configured to release the retainer support 16 upon a deformation of the retainer mount 60, which may involve a change in geometry or deformation of the front, rear, and/or side mount supports 162, 262, 362 and/or 462. Such a deformation may occur upon a severe collision event by the vehicle 100.

Figure 5:
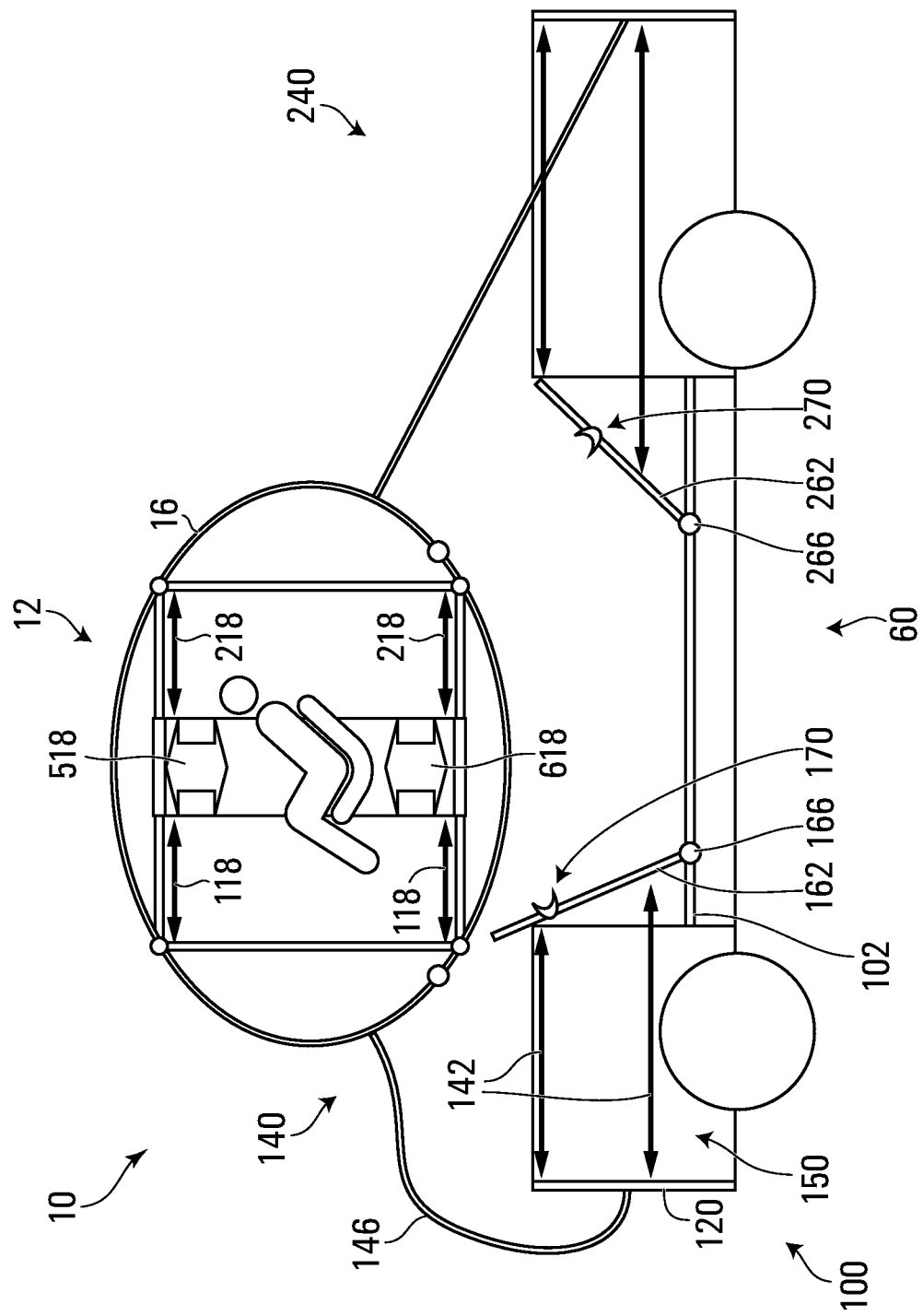
FIG. 5 is a schematic side view of the apparatus shown in FIG. 1 after a severe collision event, according to various embodiments.

Referring now to FIG. 5, there is provided a schematic side view of the vehicle 100 and the apparatus 10 after a severe collision event. For example, in some embodiments, the apparatus 10 may have been involved in a front end collision, such as, with another vehicle. Referring to FIG. 5, the severe collision event may cause the front mount support 162 to pivot about the pivotable connector 166 and the releasable connectors 170, 270, 370, and 470 of the retainer mount 60 to release the retainer support 16.

In various embodiments, releasing the retainer support 16 may keep the occupant safe from extreme forces and/or danger. For example, in some embodiments, the releasable connectors 170, 270, 370, and 470 releasing the retainer support 16 may facilitate the retainer support 16 being able to move forwards and upwards relative to the retainer mount 60, which may be generally fixed to the frame 102 of the vehicle 100. In various embodiments, this may reduce and/or slow down acceleration forces applied to the occupant in the seat 14, which may result in reduced harm to the occupant.

As discussed above, the occupant retainer impact absorbers 118, 218, 318, 418, 518 and 618, shown in FIGS. 1-3, for example, may absorb shocks that are transferred from the retainer support 16 to the occupant 15. In various embodiments, including the occupant retainer impact absorbers 118, 218, 318, 418, 518 and 618 between the retainer support 16 and the occupant seat 14 may result in reduced impact and/or shock felt by the occupant 15. In various embodiments, the occupant retainer impact absorbers 118, 218, 318, 418, 518 and 618 may lessen the impact to the occupant 15 when the releasable occupant retainer 12 impacts a hard surface or is stopped quickly. In some embodiments, the general shape of the releasable occupant retainer 12 (e.g., oval, cocoon, capsule, spherical, etc.) may allow it to roll to a degree limited by tethering to the vehicle frame 102 by flexible tension members. In various embodiments, the rolling may also absorb some of the impact force to the occupant.

Referring to FIGS. 1 and 2, in some embodiments, the apparatus 10 may include a front tension restraint 140 coupled between the front mount support 162 of the retainer mount 60 and the retainer support 16 of the retainer 12. In various embodiments, the front of the vehicle 100 may be reinforced with a front bumper 120, which may be included in the front tension restraint 140. In some embodiments, the front bumper 120 may include a strong impact plate. The front tension restraint 140 may include front deformable impact absorbers 142 coupled to the front mount support 162 and front flexible tension members 146 coupled between the front deformable impact absorbers 142 and the retainer support 16. In some embodiments, the front deformable impact absorbers 142 may include shock absorbers, springs and/or deformable shock absorbing material. In some embodiments, the front deformable impact absorbers 142 may include 4 or more separate shocks or impact absorbers. In some embodiments, the front flexible tension members 146 may include 2 or more separate flexible tension members. In some embodiments, the deformable impact absorbers 142 may include a portion of the vehicle 100 or the vehicle frame 102 configured to absorb the forces during an impact or collision. In some embodiments, the front flexible tension members 146 may be coupled to the front deformable impact absorbers 142 via the front bumper 120.

In some embodiments, the front flexible tension members 146 may be made of a material that is strong under tension and flexible, such as, for example a steel cord. Referring to FIG. 1, in some embodiments, the front tension restraint 140 may include additional deformable impact absorbers, such as a front deformable impact absorber or absorbing zone 150, which may include deformable impact absorbing material. In various embodiments, front deformable impact absorbers 142 may be positioned so that they will be directed away from the occupant seat 14. For example, in some embodiments, each of the front deformable impact absorbers 142 may be aligned such that they are not pointed at the occupant seat 14. In various embodiments, such a configuration may avoid safety issues associated with front deformable impact absorbers 142 releasing towards an occupant in the occupant seat 14.

In some embodiments, in a pre-collision state, as shown in FIG. 2, the front flexible tension members 146 may be held at high tension by the deformable impact absorbers 142 and 150 to help hold the retainer support 16 in connection with the front mount support 162. In various embodiments, the retainer support 16 may be held in place by gravity, by flexible tension members, including the flexible tension members 146, and by the releasable connectors 170, 270, 370, and 470 (shown in FIGS. 4 and 3, for example), for example. In some embodiments, the deformable impact absorbers 142 may be configured to deform or compress during a collision as shown in FIG. 5. In various embodiments, the front tension restraint 140 may be configured such that deformation of the impact absorbers 142 and 150 releases tension on the flexible tension members 146 to facilitate movement of the retainer support 16 relative to the retainer mount 60. For example, in some embodiments, the impact absorbers 142 and 150 may be configured to deform such that they have a reduced length and the reduction in length may be generally aligned with the flexible tension members 146 as shown in FIG. 5, for example.

In some embodiments, the deformable impact absorbers 142 and 150 may be configured such that the deformable impact absorbers 142 and 150 deform or compress during a collision down to their limits (the deformable impact absorbers 142 and 150 are shown at their limit in FIG. 5), after which the deformable impact absorbers 142 and 150 may transfer forces to the front mount support 162 to deform the retainer mount 60 by pivoting the front mount support 162 about the pivotable connector 166 as shown in FIG. 5.

Accordingly, in various embodiments, the deformable impact absorbers 142 and 150 may be less stiff than the retainer mount 60 about the pivotable connector 166 up to a threshold level of deformation, after which the deformable impact absorbers may be stiffer than the retainer mount 60.

In various embodiments, this stiffness relationship between the impact absorbers 142 and 150, and the retainer mount 60 may facilitate release of the releasable occupant retainer 12 after the impact absorbers 142 and 150 have deformed beyond the limit level of deformation. In some embodiments, this stiffness relationship may facilitate releasing the retainer 12 after severe collision events but in minor collision events the deformable impact absorbers 142 and 150 will absorb the impact force not reaching their limits and thus, without deforming and dislodging the releasable occupant retainer 12.

For example, in some embodiments, the deformable impact absorbers 142 and 150 may include springs that are deformable or compressible down to a minimum deformed length, after which forces applied to the springs and/or shock absorbers will be generally transferred to the retainer mount 60. For example, this minimum deformed length may be reached when springs included in the deformable impact absorbers 142 and 150 reach their minimum length limits.

Referring to FIG. 5, deformation of the retainer mount 60 may cause the releasable connectors 170, 270, 370, and 470 to release the retainer support 16 and displace the retainer support 16 relative to the retainer mount 60.

In various embodiments, after a severe collision, as shown in FIG. 5, the flexible tension members 146 may remain coupled between the deformable impact absorbers 142 and 150 and the retainer 12, for example, via the front bumper 120. In some embodiments, this coupling may keep the releasable occupant retainer 12 from uncontrollably and unsafely travelling away from the vehicle 100.

Figure 6:
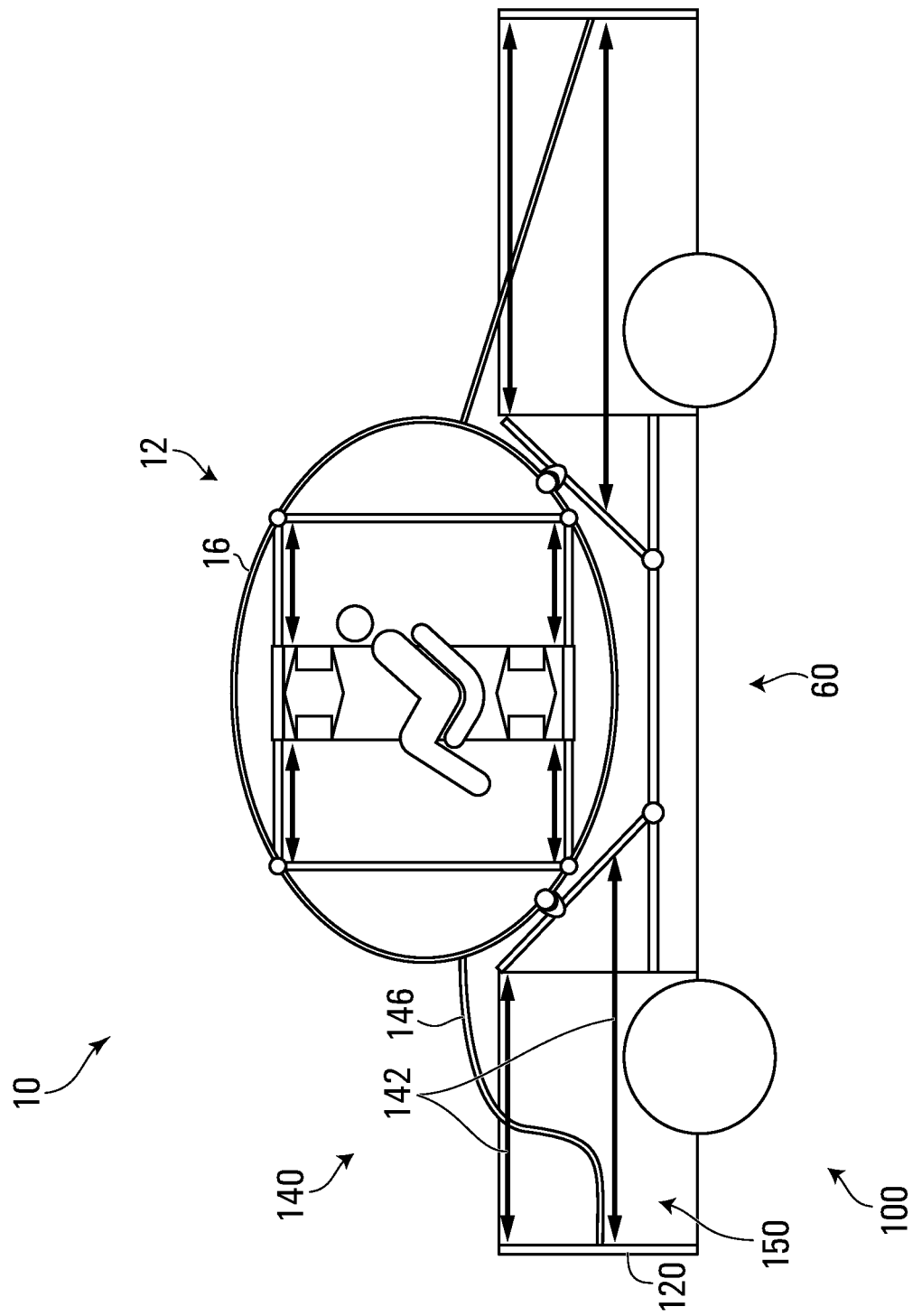
FIG. 6 is a schematic side view of the apparatus shown in FIG. 1 after a minor impact, according to various embodiments.

Referring to FIG. 6, there is shown the apparatus 10 after a minor impact, where the front deformable impact absorbers 142 and 150 have not been deformed beyond the threshold level of deformation (their limits) and so the retainer mount 60 has not been deformed. In various embodiments, such a minor impact would not result in releasing the retainer 12 from the retainer mount 60.

Referring to FIG. 2, in various embodiments, the apparatus 10 may include a rear tension restraint 240 generally similar to the front tension restraint 140 described above. In some embodiments, the rear tension restraint may be configured to deform upon a collision or impact with a rear of the vehicle 100. In some embodiments, after a severe front impact, as shown in FIG. 5, forward momentum of the releasable occupant retainer 12 may pull flexible tension members 246 of the rear tension restraint 240 causing rear deformable impact absorbers 242 and 250 to deform to absorb some impact force and allow the occupant retainer 12 to move forward relative to the vehicle 100. In various embodiments, this deformation of the rear deformable impact absorbers 242 and 250 may reduce forces and impact felt by the occupant 15.

In various embodiments, the rear tension restraint 240 may include the rear deformable impact absorbers 242 and 250 (where the rear deformable impact absorber 250 may include impact absorbable material), a rear bumper 240, and the rear flexible tension members 246. In some embodiments, the rear tension restraint 240 may mitigate forces felt from impact from the rear and protect the occupant similar to what is described above for frontal impact.

Referring to FIG. 3, in various embodiments, similar to the front, the occupant will be protected from side impact. The apparatus 10 may include side tension restraints 340 and 440 that may be configured to act generally similarly to the front and rear tension restraints 140 and 240 (shown in FIGS. 1 and 2 for example) during a collision event on the side of the vehicle 100. The side tension restraints 340 and 440 may include deformable impact absorbers 350 and 450 including impact absorbing material, and deformable impact absorbers 342 and 442 respectively. The side tension restraints 340 and 440 may include flexible tension members 346 and 446 coupled between the deformable impact absorbers 342 and 442 and the retainer support 16

Figure 7:
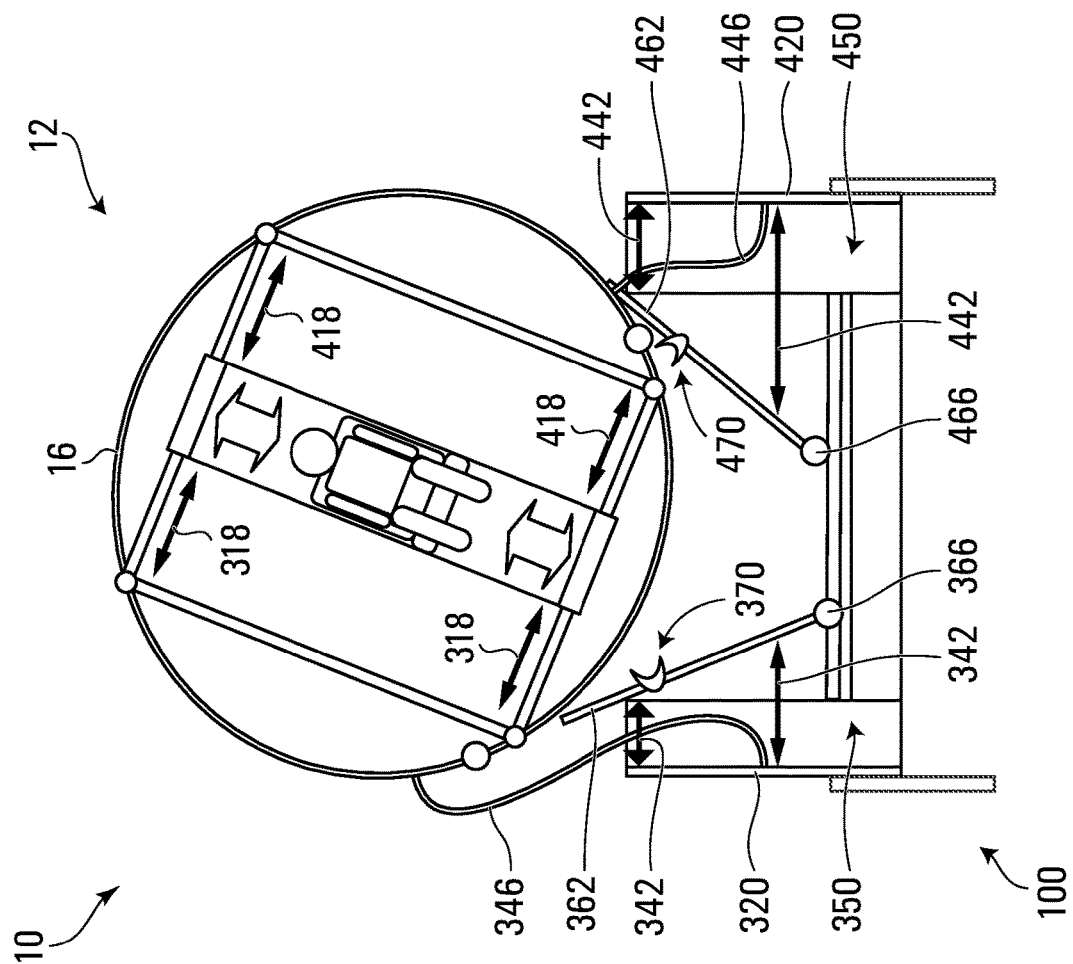
FIG. 7 is a schematic front view of the apparatus shown in FIG. 1 after a severe collision event, according to various embodiments.

Referring to FIG. 7, there is shown a schematic front view of the vehicle 100 and the apparatus 10 after a severe side collision event. For example, in some embodiments, the apparatus 10 may have been involved in a side collision, such as by being hit by another vehicle on the side, for example. Referring to FIG. 7, the severe collision event may cause the side mount support 362 to pivot about the pivotable connector 366 and the releasable connectors 370 and 470 of the retainer mount 60 to release the retainer support 16. Referring to FIG. 7, in various embodiments, the side tension restraints 340 and 440 may include bumpers 320 and 420 that may each include at least one reinforced plate and/or bar, for example.

In various embodiments, the bumpers 120, 220, 320, and 420 may be placed to receive initial impact during a front, side, or rear collision and distribute it to a wider area activating front, back and side impact zones. In various embodiments, the bumpers may be coupled between flexible tension members and deformable impact absorbers.

Figure 8:
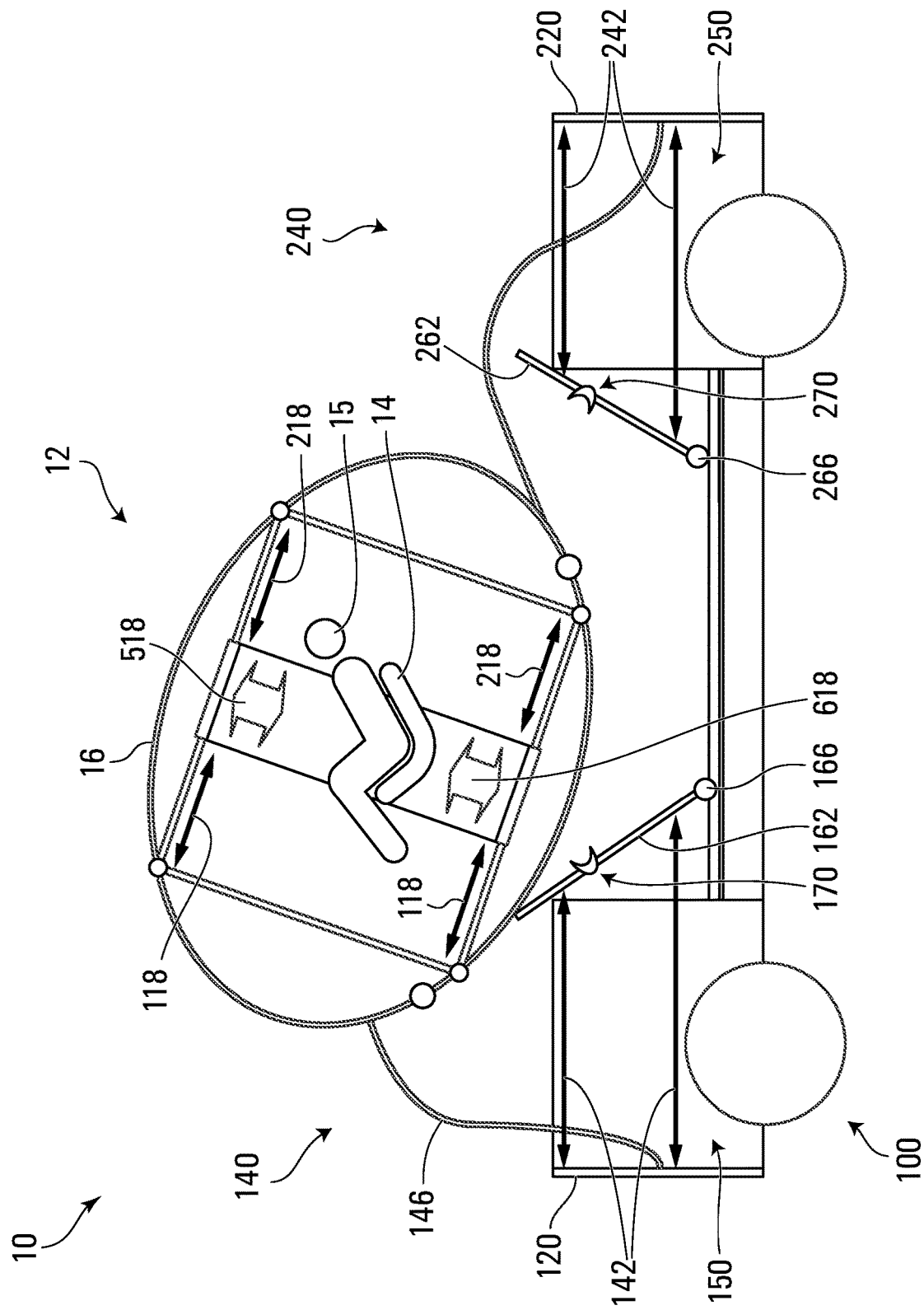
FIG. 8 is a schematic side view of the apparatus shown in FIG. 1 after an extreme impact, according to various embodiments.

Referring to FIG. 8, there is shown the apparatus 10 after an extreme impact, where the front deformable impact absorbers 142 and 150 have been deformed beyond the threshold level of deformation and the impact was so great that the rear deformable impact absorbers 242 and 250 included in the rear tension restraint 240 have also been deformed beyond their threshold level by forward momentum of the retainer 12. In various embodiments, such an extreme impact would result in releasing the retainer 12 from the retainer mount 60. In some embodiments, this deformation of both the front and rear deformable impact absorbers may reduce forces applied to the occupant 15.

In various embodiments, the force of the impact may be slowed (absorbed) by multiple mechanisms and thus, less force may be applied to the occupant. In some embodiments, in the case of a frontal impact, First impact will be taken and absorbed by the front tension restraint 140 (by the front deformable impact absorbers 142 and 150), Second when the momentum of the occupant retainer 12 is moving forward due to the inertia, it will pull the rear bumper 220 forward due to the tension in the rear flexible tension members 246, activating the rear deformable impact absorbers 242 and 250.

Third, the deformation of the retainer mount 60. When the limits of the front and rear impact absorbers are reached, the mount supports 162 and 262 will pivot on their respective pivotable connectors 166 and 266. This will dislodge the releasable occupant retainer 12. The releasable occupant retainer 12 will not be dislodged far from the vehicle frame 102 due to the flexible tension members 146, 246, 346 and 446. The releasable occupant retainer 12 may impact the front obstacle (tree or a car, for example) or adjacent road surface.

In various embodiments, the occupant will be further protected by the impact absorbers 118, 218, 318, 418, 518 and 618 within the releasable occupant retainer 12. The impact absorbers in the front 118, rear 218, sides 318 and 418, and above 518 and/or below 618 the seat may be activated depending on how the impact occurs.

In various embodiments, the apparatus 10 may have a center portion which houses the releasable occupant retainer 12. A front portion of the apparatus 10 may include the front tension restraint 140 including the front bumper 120 and the front deformable impact absorbers 142 and 150. The front bumper 120 may include a plate, mesh and/or bars that are configured to distribute an impact to a wider area. In some embodiments, the front tension restraint 140 may include impact absorbing material such as honeycombed material (which may be included in the front deformable impact absorber 150, for example), springs and/or mechanical shock absorbers (which may be included in the front deformable impact absorber 142). The retainer support 16 may be held in place by the flexible tension members 146 between the bumper 120 and the retainer support 16. In some embodiments, the flexible tension members 146 may be made of a material that is strong under tension and flexible, such as, for example a steel cord. In various embodiments, the apparatus 10 may include similar tension restraints that may act as impact absorbing systems for the back and sides.

Figure 9:
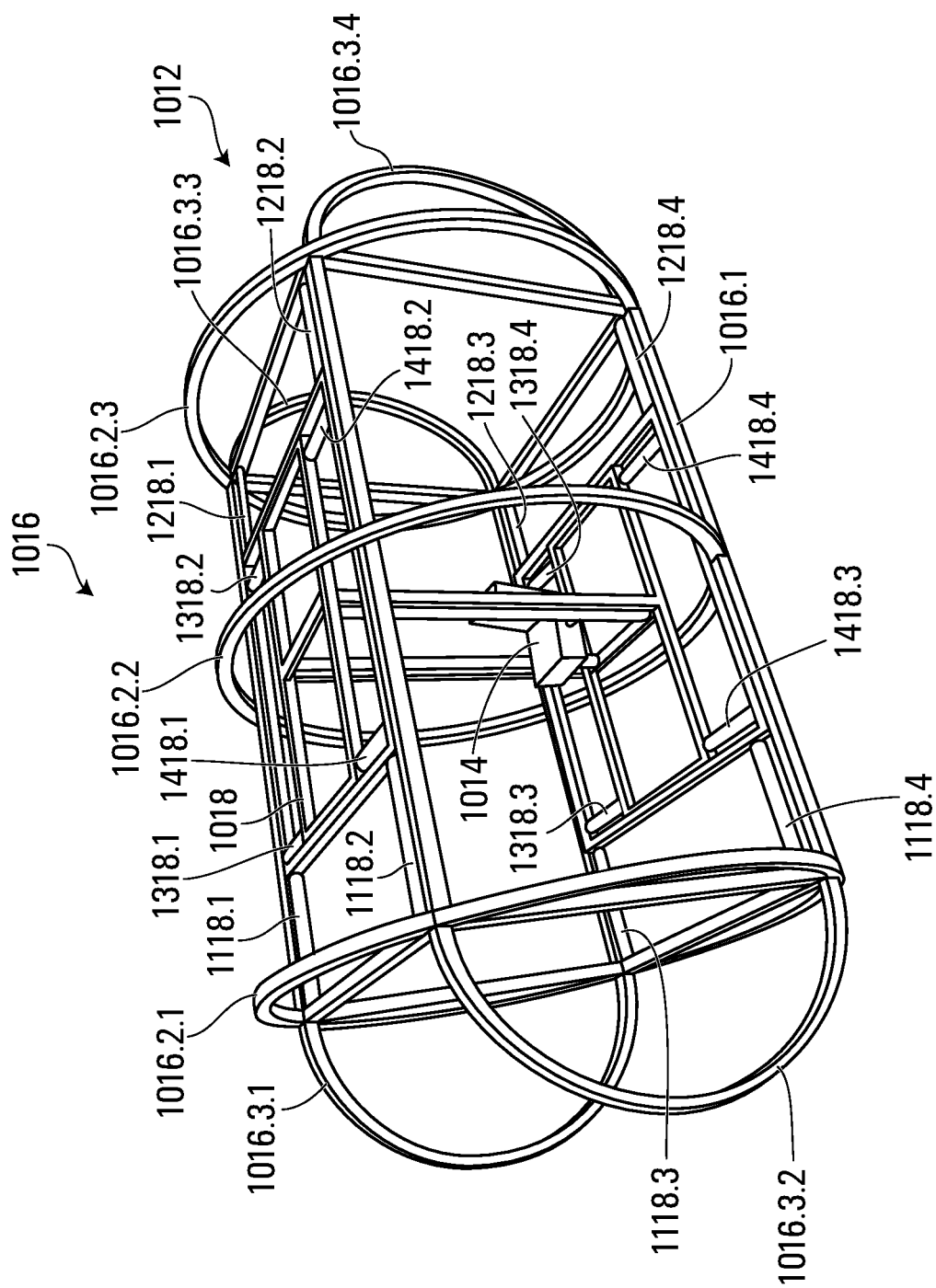
FIG. 9 is a perspective view of a releasable occupant retainer, which may be used in the apparatus shown in FIG. 1, in accordance with various embodiments.

FIG. 9 shows a 3D model of an implementation of a releasable occupant retainer 1012 which may be used as the releasable occupant retainer 12 described above with reference to FIGS. 1-8. The releasable occupant retainer 1012 in this embodiment includes impact absorbers protecting the occupant when the occupant is in an occupant seat 1014. In the embodiment shown in FIG. 9, the retainer 1012 includes a retainer support 1016 that is capsule shaped. The retainer 1012 includes a front set of impact absorbers 1118.1, 1118.2, 1118.3, and 1118.4 (4 in number in this illustration) and a rear set of impact absorbers 1218.1, 1218.2, 1218.3, and 1218.4 (4 in number in this illustration) configured to absorb and mitigate impacts from the front and/or rear. The retainer 1012 includes right and left sets of impact absorbers 1318.1, 1318.2, 1318.3, and 1318.4 (4 in number) and 1418.1, 1418.2, 1418.3, and 1418.4 (4 in number), which may mitigate side impacts. Similarly, the retainer 1012 includes top impact absorbers 1518.1 and 1518.2 above (2 in number) (shown in FIG. 10) and bottom impact absorbers 1618.1 and 1618.2 below (2 in number) (shown in FIG. 10), which may mitigate impacts when the releasable occupant retainer 1012 is dislodged and has forces rendered from the vertical axis of the retainer 1012. As discussed above, in various embodiments, these 6 sets of impact absorbers 1118.1-1118.4, 1218.1-1218.4, 1318.1-1318.4, 1418.1-1418.4, 1518.1-1518.2 and 1618.1-1618.2, acting together may mitigate impacts from all directions.

Figure 10:
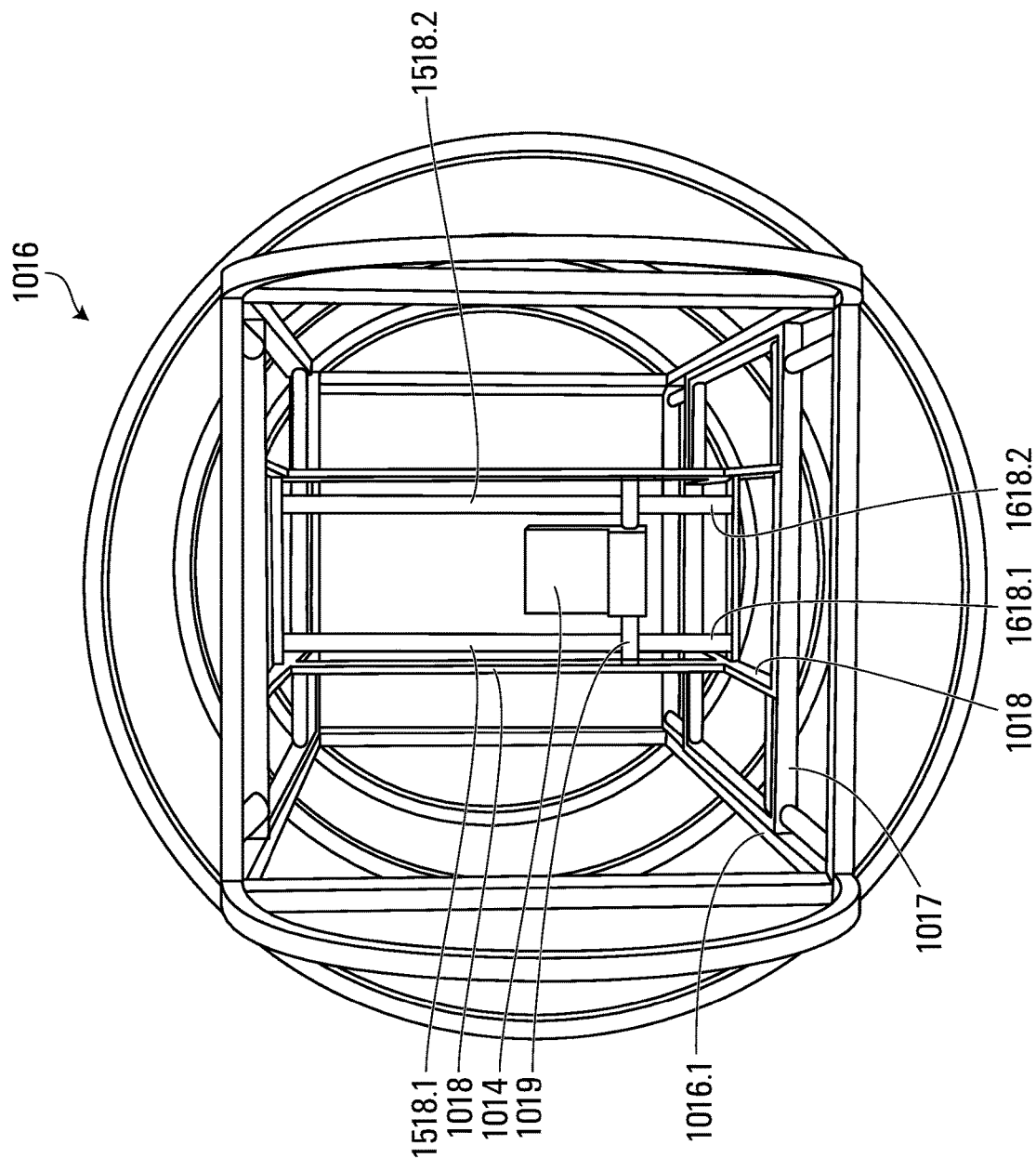
FIG. 10 is a front view of the releasable occupant retainer shown in FIG. 9, in accordance with various embodiments.
Figure 11:
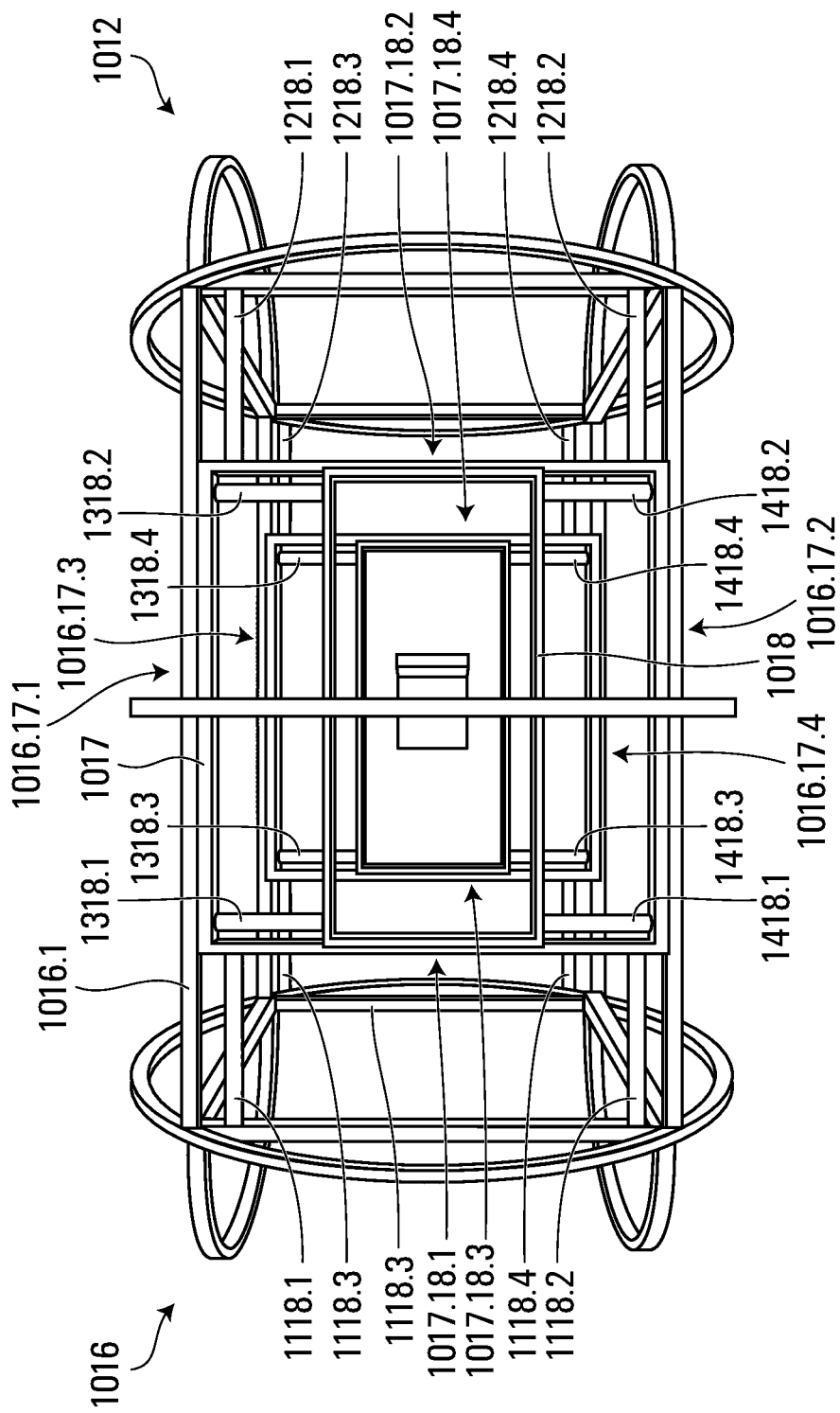
FIG. 11 is a top view of the releasable occupant retainer shown in FIG. 9, in accordance with various embodiments.

FIGS. 9-11 show a 3D rendition of how the impact absorbers may work according to various embodiments.

Front-rear system: Referring to FIG. 11, a sliding intermediate frame 1017 may move front and rear along a rectangular frame 1016.1 of the retainer support 1016. When a sudden impact from the front and/or rear occurs, this front to rear movement will be mitigated and the forces absorbed by the impact absorbers 1118.1-1118.4 and 1218.1-1218.4.

Side to side system: Referring to FIG. 11, an inner frame 1018 may move side to side (right to left, and left to right) on the intermediate frame 1017. When a sudden impact from the sides (left or right) occurs, the side-to-side movement will be mitigated and the forces absorbed by the impact absorbers 1318.1-1318.4 (right) and 1418.1-1418.4 (left).

Up down (vertical axis) system: Referring to FIG. 10, a seat frame 1019 attached to an occupant seat 1014, may facilitate movement of the seat 1014 up and down in the inner frame 1018. When impact occurs when the releasable occupant retainer 1012 is dislodged and hits the ground, a tree or another object, for example, and forces are rendered in the up-down direction, the movements in this direction may be mitigated and forces absorbed by impact absorbers above 1518.1 and 1518.2 and below 1618.1 and 1618.2 the seat frame 1019.

These impact absorbers in the 3 axes 1118.1-1118.4, and 1218.1-1218.4, 1318.1-1318.4, and 1418.1-1418.4, and 1518.1-1518.2 and 1618.1-1618.2 may protect the occupant in all directions and when the releasable occupant retainer 1012 is rolling over on the ground after being dislodged from the vehicle 100 shown in FIGS. 1-8. The rolling of the retainer 1012 may be limited by flexible tension members which tether the releasable occupant retainer 1012 to the vehicle frame 102.

Referring to FIG. 10, the retainer 1012 includes the occupant seat 1014 and the vertical occupant retainer impact absorbers 1518.1, 1518.2, 1618.1 and 1618.2 coupled to the occupant seat 1014.

Referring to FIG. 9, the retainer 1012 includes the retainer support 1016 having the rectangular frame portion 1016.1 circular frame portions 1016.2.1, 1016.2.2, and 1016.2.3, and semi-circular frame portions 1016.3.1, 1016.3.2, 1016.3.3, and 1016.3.4. In various embodiments, the convex curvature of outer portions of the retainer support 1016 may facilitate rolling of the retainer 1012 when it is dislodged from the retainer mount 60 shown in FIGS. 1-8.

Referring to FIG. 10, the retainer 1012 includes the inner frame 1018, to which the vertical occupant retainer impact absorbers 1518.1, 1518.2, 1618.1, and 1618.2 are coupled. Referring to FIG. 11, in various embodiments, the retainer 1012 also includes the side or right and left occupant retainer impact absorbers 1318.1-1318.4 (right) and 1418.1-1418.4 (left) coupled to the inner frame 1018.

Referring to FIG. 10, the retainer 1012 includes the intermediate frame 1017 to which the side occupant retainer impact absorbers 1318.1-1318.4 (right) and 1418.1-1418.4 (left) are coupled, such that the side occupant retainer impact absorbers are coupled between the inner frame 1018 and the intermediate frame 1017. In some embodiments, the inner frame 1018 may be slidably coupled to the intermediate frame 1017 via sliding connectors 1017.18.1, 1017.18.2, 1017.18.3, and 1017.18.4 (shown in FIG. 11) to facilitate vertical, front, and rear support and to allow side to side sliding of the inner frame 1018 relative to the intermediate frame 1017. In some embodiments, the sliding connectors 1017.18.1-1017.18.4 may include overlapping portions and/or channels, for example.

Referring to FIG. 11, in various embodiments, the retainer 1012 includes the front and rear occupant retainer impact absorbers 1118.1-1118.4 and 1218.1-1218.4 coupled between the intermediate frame 1017 and the rectangular frame 1016.1. In some embodiments, the intermediate frame 1017 may be slidably coupled to the rectangular frame 1016.1 via sliding connectors 1016.17.1, 1016.17.2, 1016.17.3, and 1016.17.4 to facilitate vertical and side to side support and front to rear sliding of the intermediate frame 1017 relative to the rectangular frame 1016.1. In some embodiments, the sliding connectors 1016.17.1-1016.17.4 may include overlapping portions and/or channels, for example.

In various embodiments, use of a sliding configuration including the sliding connectors 1017.18.1-1017.18.4 and/or 1016.17.1-1016.17.4 may facilitate more stable and/or strong connections.

Figure 12:
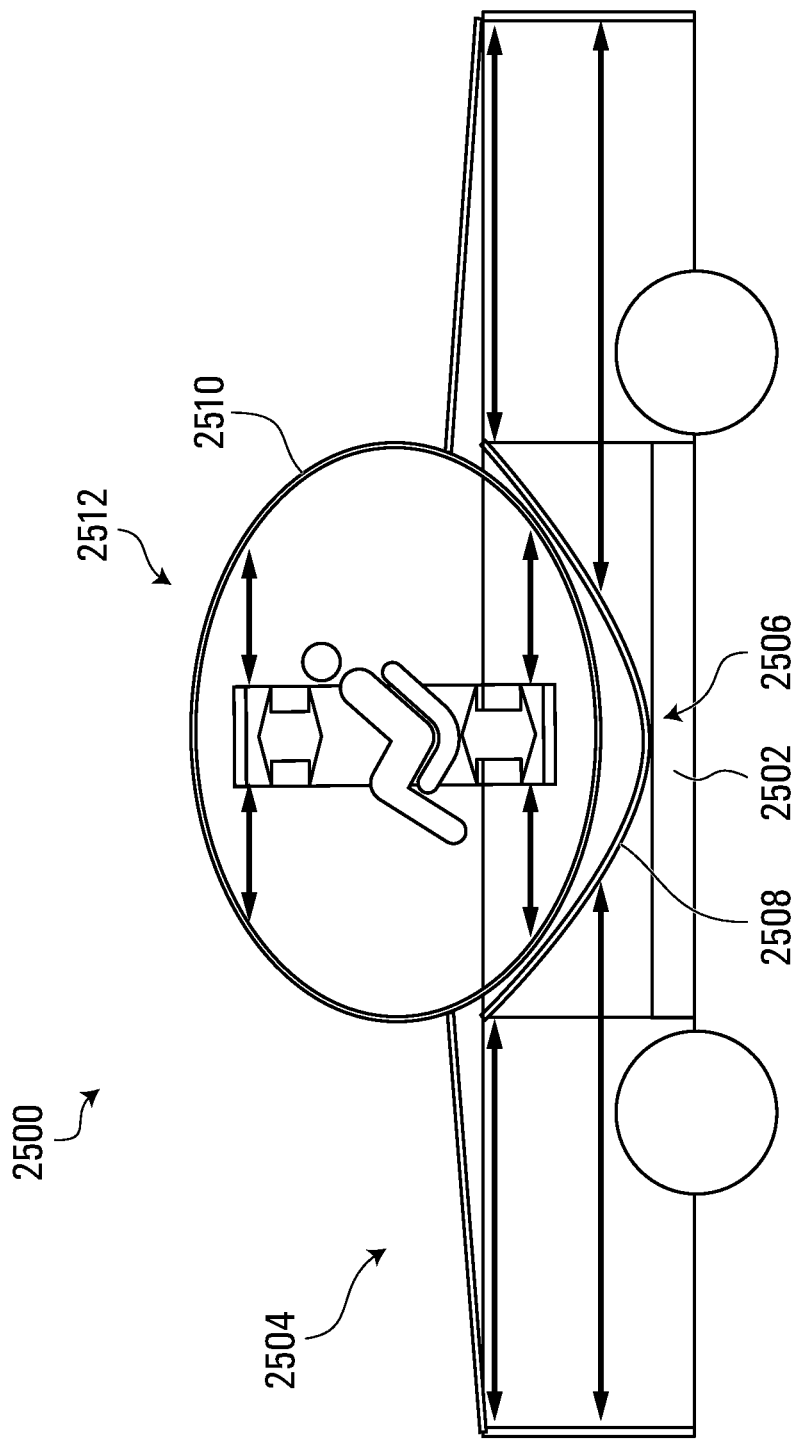
FIG. 12 is a schematic side view of an apparatus for facilitating occupant safety in a vehicle, according to various embodiments.

Referring to FIG. 12, there is shown a schematic view of an apparatus 2500 for facilitating occupant safety in a vehicle 2504 having a vehicle frame 2502, in accordance with various embodiments. In various embodiments, the apparatus 2500 may function generally similarly to the apparatus 10 described above with reference to FIGS. 1-8, except that the apparatus 2500 may include a retainer mount 2506 that differs from the retainer mount 60 described above in connection with FIGS. 1-8. In some embodiments, the retainer mount 2506 shown in FIG. 12 may include a mount support 2508 including a deformable frame or bar, configured to deform in a severe collision, to displace a retainer support 2510 of an occupant retainer 2512 from the retainer mount 2506. For example, in some embodiments, the mount support 2508 may include a deformable frame or bar made of a strong but deformable material, such as aluminum. In various embodiments, the mount support 2508 shown in FIG. 12 may be more stiff than deformable impact absorbers up to a threshold level of deformation of the deformable impact absorbers, after which the mount support 2508 may be less stiff and may deform.

Figure 13:
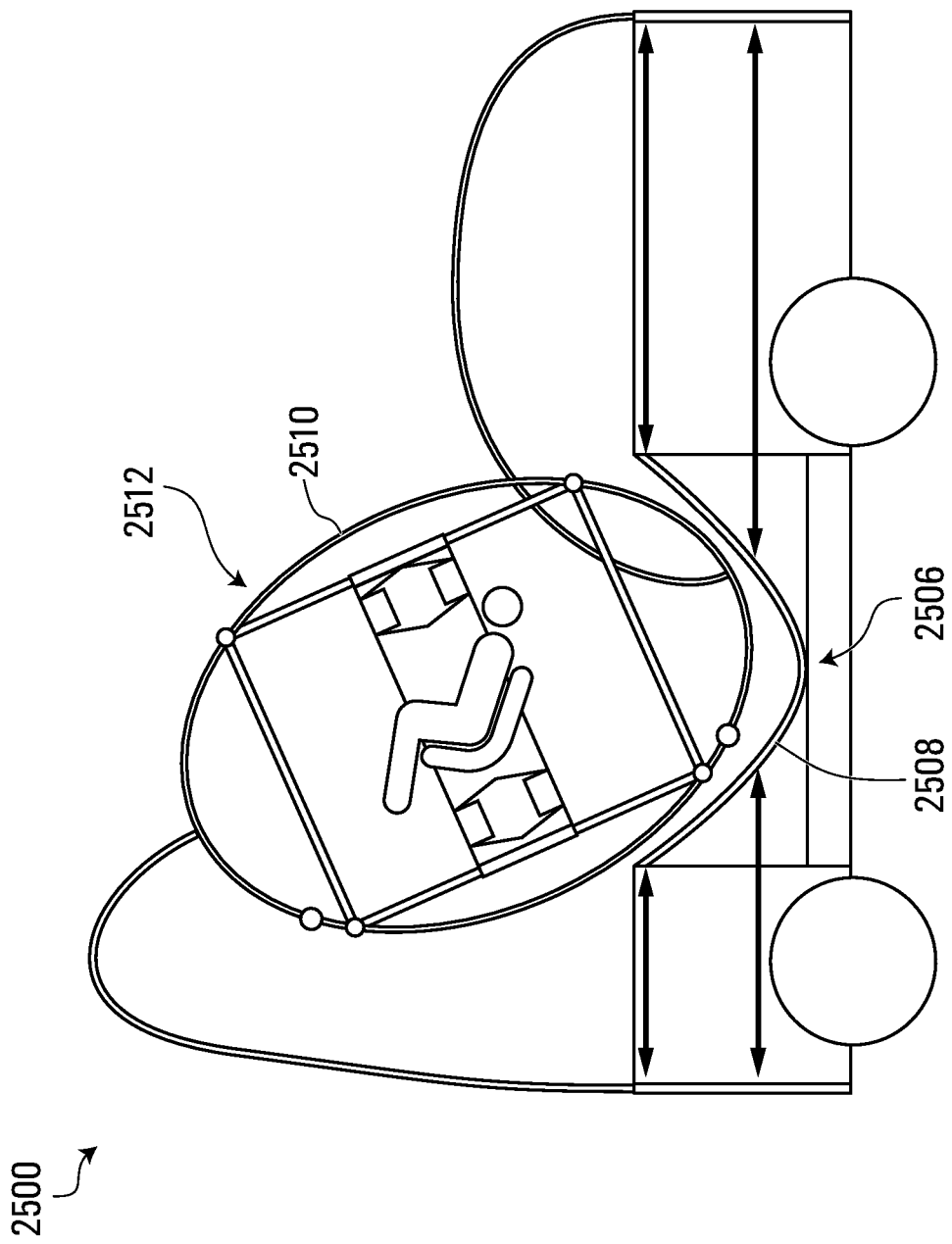
FIG. 13 is a schematic side view of the apparatus shown in FIG. 12 after a severe collision event, according to various embodiments.

FIG. 13 shows the apparatus 2500 after a severe collision event where the mount support 2508 has deformed and an occupant retainer 2512 has been released from the retainer mount 2506.

While specific embodiments of the invention have been described and illustrated, such embodiments should be considered illustrative of the invention only and not as limiting the invention as construed in accordance with the accompanying claims.

The invention claimed is:

1. An apparatus for facilitating occupant safety in a vehicle having a vehicle frame, the apparatus comprising:

a releasable occupant retainer for retaining at least one occupant, the retainer including:
 an occupant seat;
 a retainer support; and
 at least one occupant retainer impact absorber coupled between the occupant seat and the retainer support; and a retainer mount configured to be coupled to the vehicle frame, the retainer mount including a mount support and at least one releasable connector coupled to the mount support and releasably coupled to the retainer support of the occupant retainer, the at least one releasable connector configured to release the retainer support upon a severe collision event,
 wherein the retainer mount is deformable upon the severe collision event and the at least one releasable connector is configured to release the retainer support upon deformation of the retainer mount, one or more tension restraints coupled between the mount support of the retainer mount and the retainer support, each of the one or more tension restraints including:
 an impact absorber coupled to the mount support,
  wherein the impact absorber comprises impact absorbing material,
  wherein the impact absorber includes at least one spring and/or at least one shock absorber; and
 at least one flexible tension member coupled between the deformable impact absorber and the retainer support, wherein the tension restraint is configured such that deformation of the impact absorber releases tension on the at least one flexible tension member to facilitate movement of the retainer support relative to the retainer mount.

* * * * *